No. 764,340. PATENTED JULY 5, 1904.
C. W. BOLTON.
ICE CREEPER FOR HORSES.
APPLICATION FILED NOV. 27, 1903.
NO MODEL.
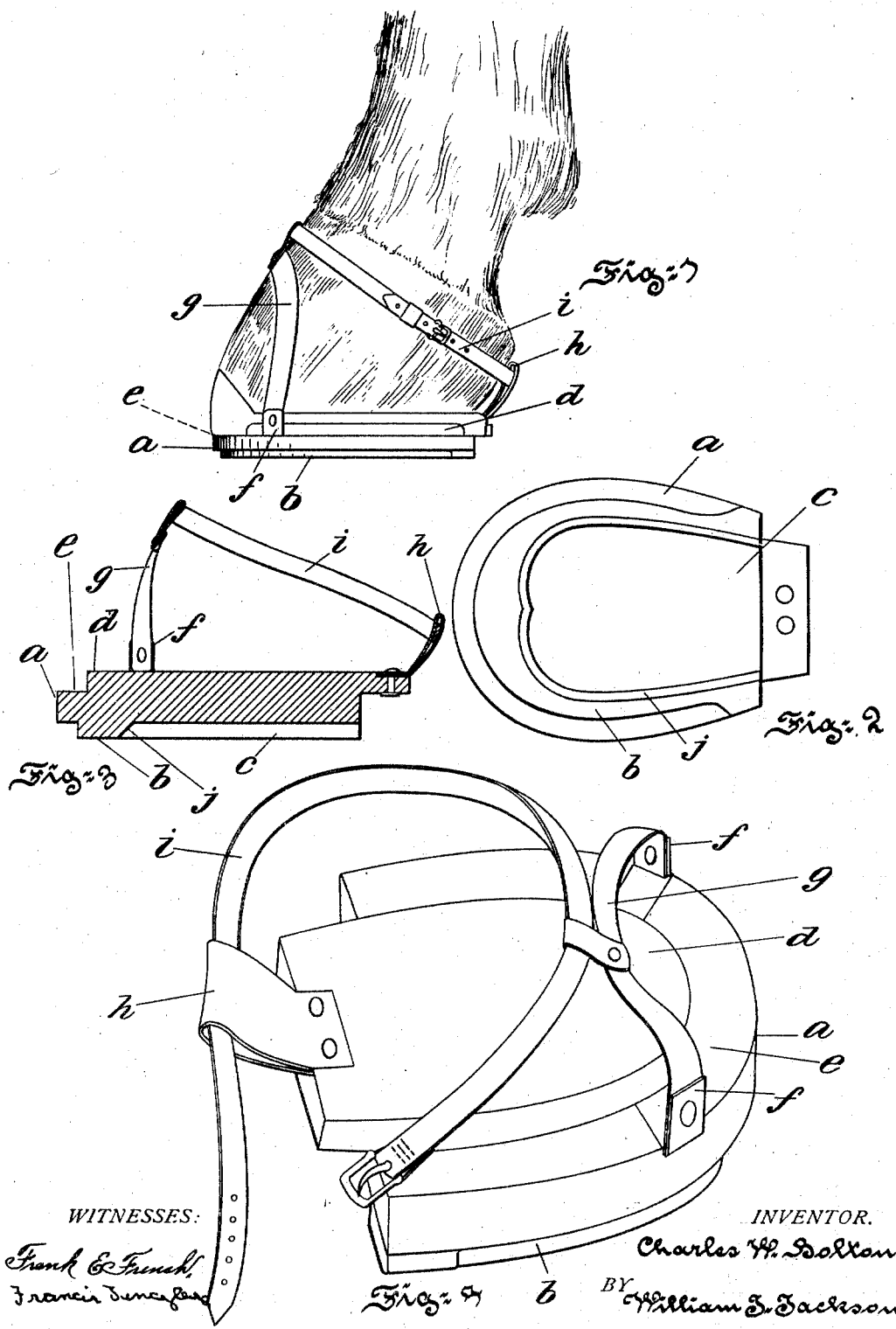

No. 764,340. Patented July 5, 1904.

UNITED STATES PATENT OFFICE.

CHARLES W. BOLTON, OF FOX CHASE, PENNSYLVANIA.

ICE-CREEPER FOR HORSES.

SPECIFICATION forming part of Letters Patent No. 764,340, dated July 5, 1904.

Application filed November 27, 1903. Serial No. 182,772. (No model.)

*To all whom it may concern:*

Be it known that I, CHARLES W. BOLTON, a citizen of the United States, residing at Fox Chase, in the county of Philadelphia and State of Pennsylvania, have invented certain new and useful Improvements in Ice-Creepers for Horses, of which the following is a specification.

The principal object of the present invention is to provide improved ice-creepers so adapted for attachment to the shod feet of horses that fastening mediums—such as nails, screws, clamps, &c.—are eliminated.

Another object of the invention is to dispense with "creepers," so called—as, for instance, steel or other spurs.

A still further object of the invention is to provide ice-creepers of sandal-like form and constructed of material calculated to adhere more or less to icy surfaces, thereby preventing to a great degree slipping.

To these and other ends hereinafter set forth the invention comprises the improvements to be presently described and finally claimed.

The nature, characteristic features, and scope of the invention will be more fully understood from the following description, taken in connection with the accompanying drawings, forming part hereof, and in which—

Figure 1 is a side elevational view of an ice-creeper embodying the invention and shown in application to the shod foot of a horse. Fig. 2 is an inverted plan view of the ice-creeper. Fig. 3 is a sectional view of the same, and Fig. 4 is a perspective view of said creeper.

In the drawings the ice-creeper is shown as being in form somewhat like a sandal, whose body portion is constructed of rubber or rubber substitutes. As illustrated in Figs. 2 and 3, the tread $b$ is formed integral with the base $a$ and is of the configuration of a horseshoe and forms a suction-chamber $c$. Formed integral with the base there may also be a slightly-elevated portion or ridge $d$, adapted to form a pad for the frog of the hoof. As shown, the upper portion of the base $a$ forms an annular rim $e$ for the reception of the horseshoe. At or near the front of the base there may be vulcanized to the same metallic strips $f$, to which in turn may be riveted or otherwise secured thereto a strap, as $g$. Suitably connected with the base and at the rear thereof is a member $h$, provided with an opening for the reception of a strap $i$. In the drawings the part $d$ extends beyond the base for the attachment of the member $h$. This strap $i$ engages with the strap $g$ and is arranged to pass around the hoof of the horse and may be fastened in any suitable manner—as, for instance, by the means shown in the drawings.

In using the ice-creeper, by reason of the adhesive qualities characteristic of rubber and, further, by virtue of the vacuum or suction chamber $c$, slipping upon icy surfaces is reduced to a minimum. Aside from this the cost of manufacture is slight, and the mode of attaching to and detaching from the hoof is exceedingly rapid and does not require the services of a mechanic. Further, there is absolutely nothing to be sharpened, and hence the creeper is capable of immediate use at all times. The beveled part $j$ acts to prevent the caking of snow in the vacuum-chamber $c$.

It will be obvious to those skilled in the art to which the invention appertains that modifications may be made in detail without departing from the spirit thereof. Hence the invention is not limited to the precise construction and arrangement of parts hereinabove set forth, and illustrated in the accompanying drawings; but,

Having thus described the nature and objects of the invention, what I claim as new, and desire to secure by Letters Patent, is—

An ice-creeper adapted to be applied to and cover the tread of the shod foot of a horse, the body portion of said creeper consisting of a single piece of rubber comprising a base, the upper part of which forms an annular rim for the accommodation of the shoe, a flat portion extending above said rim and serving as a pad for the frog of the hoof, a tread of the configuration of a horseshoe depending from said base and forming a suction-chamber, and means at the front and rear of said creeper for guiding a securing-strap, substantially as described.

In testimony whereof I have hereunto signed my name.

CHARLES W. BOLTON.

In presence of—
   THEO. G. BRINTON,
   GEORGE W. BECHTEL.